Patented Apr. 26, 1932

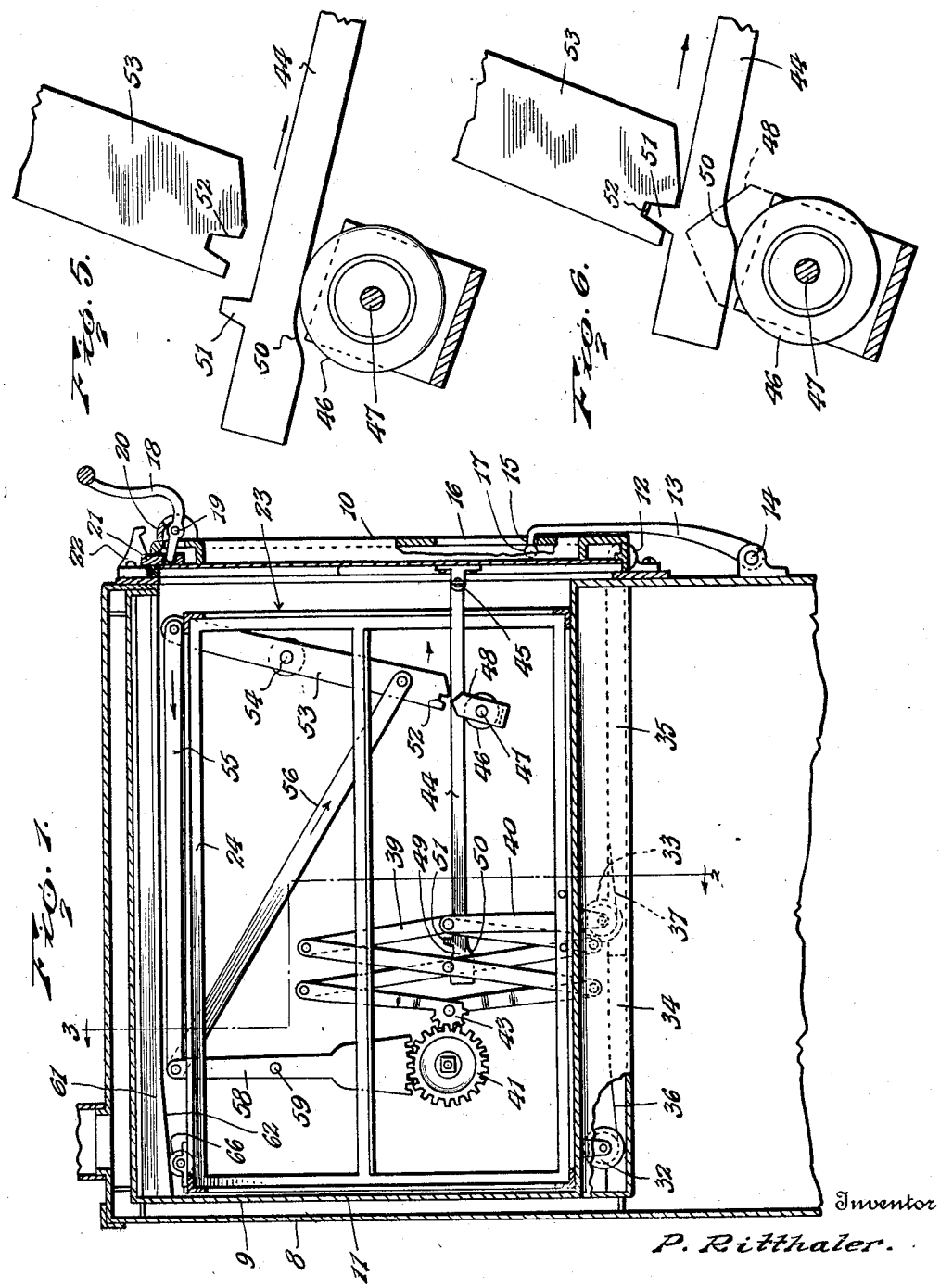

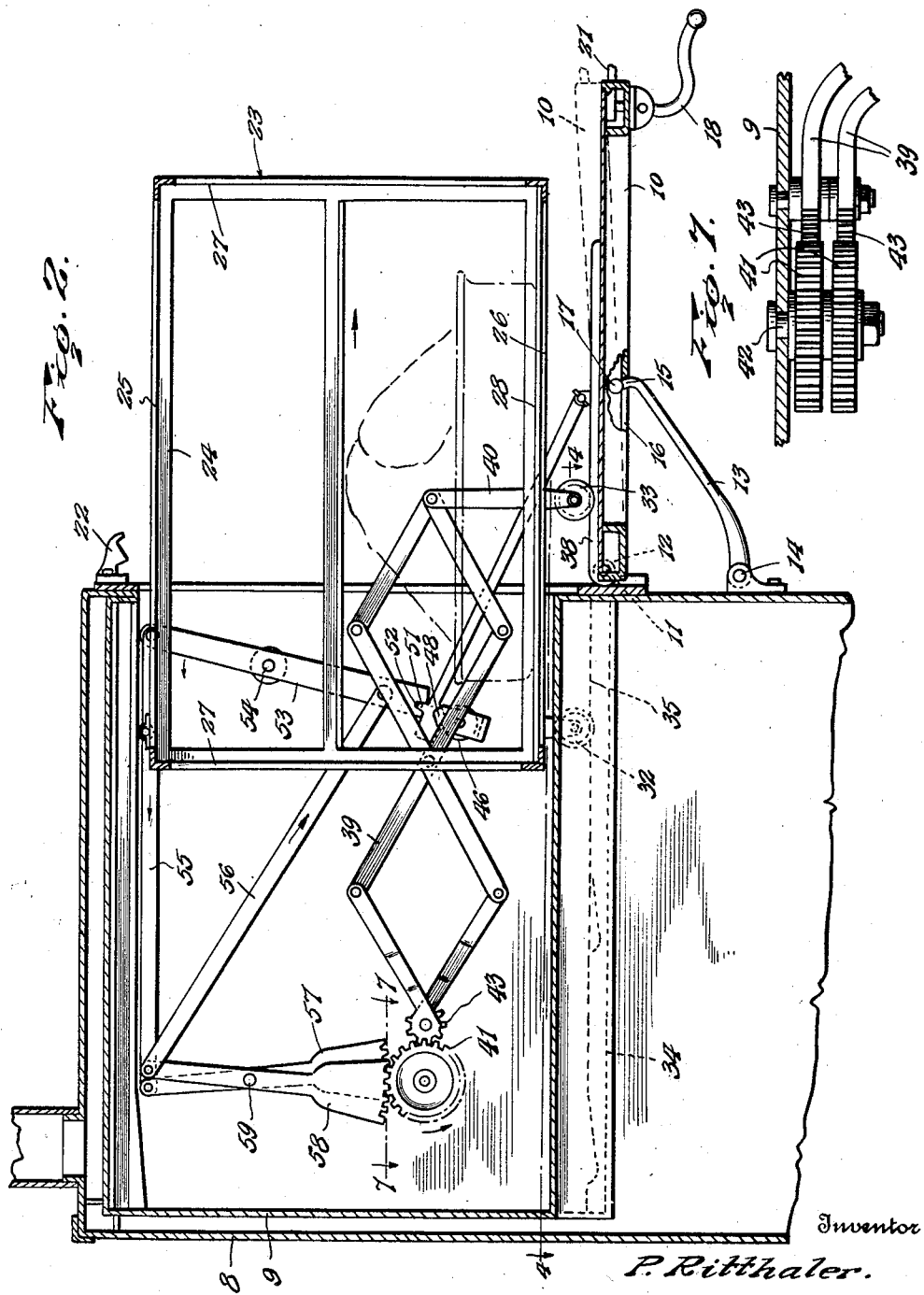

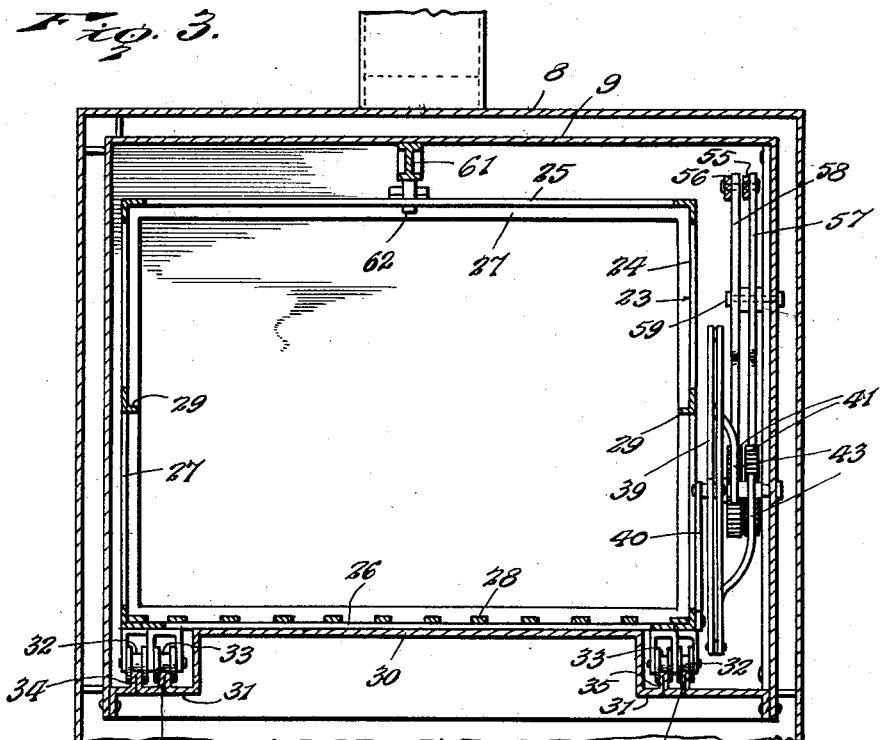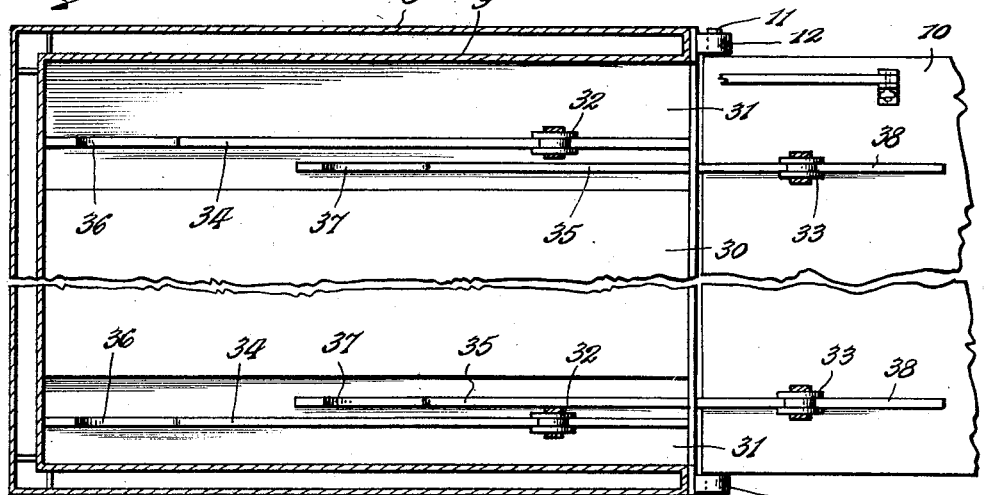

1,855,561

UNITED STATES PATENT OFFICE

PHILIPP RITTHALER, OF STICKNEY, SOUTH DAKOTA

OVEN

Application filed February 10, 1931. Serial No. 514,859.

This invention relates to ovens.

An object of the invention is to provide an oven which will automatically expel its contents so as to be disclosed to view outside the oven while the oven door is being opened and will return the contents again while the door is being closed.

A further object is to provide a novel rack for the oven contents and tracks therefor having depressions into which the rollers of the rack ride during the last few inches of travel of the oven to properly seat the rack in the oven.

A further object is to provide the oven with a lazy tong structure which is operated by a novel link mechanism connected to the oven door for extending the lazy tong structure to eject the rack to superposed position above the opened door and to retract the lazy tong structure to withdraw the rack into the oven while the door is being closed.

A still further object is to provide a novel cam mechanism for actuating the operating lever which controls the lazy tong structure, the cam being timed to operate said lever during the last few degrees of movement of the oven door while being swung open, and also actuating said lever during the first few degrees of travel of the oven door when the operator starts to close the door, the result being that the rack is not ejected until the oven door is almost fully opened and is withdrawn immediately upon starting to close the door.

A still further object is to provide an extremely simple and durable rack and operating means therefor which may be constructed to fit ovens now in use without extensive alterations as well as being adapted to be built into new ovens, the device being composed of a few strong, simple and durable parts which are inexpensive to manufacture and will not easily get out of order.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a longitudinal sectional view through an oven equipped with my improved rack and operating mechanism therefor, the rack being shown withdrawn into the oven, Fig. 2 is a longitudinal view similar to Fig. 1, with the rack shown expelled from the open oven to superposed position above the open door, Fig. 3 is a cross sectional view taken on the line 3—3 of Fig. 1, showing the rack supporting rollers, lazy tong structure and controlling link mechanism in elevation, Fig. 4 is a cross sectional view taken on the line 4—4 of Fig. 2, showing the tracks and rollers for the rack in plan, Fig. 5 is a detail elevation view showing the cam about to engage the lazy tong structure operating lever, Fig. 6 is a detail view similar to Fig. 5 showing the cam actuating the lazy tong structure operating lever, and Fig. 7 is a detail cross sectional view taken on the line 7—7 of Fig. 2, showing the actuating pinions of the lazy tong structure in plan.

Referring now to the drawings in which like characters of reference designate similar parts in the various views, 8 designates the oven casing of a cooking apparatus, and 9 designates the oven, the same being formed of sheet metal and being open at the front. A sheet metal door 10 closes the front of the oven and is hinged at opposite sides of the bottom to the door frame by hinge pintles 11 passed through suitable hinge lugs 12 on the bottom of the door frame, as shown in Figs. 1 and 4. A pair of door props 13 are provided, as usual, each prop being pivoted to a corresponding hinge lug 14 on the heater structure and having an inturned upper end 15 which is slidably received in a vertical slot 16 in the door and terminates in a ball 17. A goose neck handle 18 is pivoted, as shown at 19, between hinge lugs 20 on the upper rim of the door and is terminally equipped with a latch 21 which engages in a notched catch 22 on the door frame to hold the door closed. Preliminary rocking of the handle toward the oven withdraws the latch from the catch so that the door may be subsequently opened to the horizontal to assist in supporting the oven rack 23 when the latter is thrust out of the oven.

The oven rack is preferably formed of metal strips or bars joined together in any preferred manner to produce a frame of slightly smaller dimension than the oven, and comprising sides 24, a top 25, a bottom 26 and ends 27. Angle iron may be used in the construction of the rack if desired. Parallel slats 28 may be arranged longitudinally between the ends of the bottom of the rack to form a support for the contents of the rack. Longitudinal angle irons 29 may be disposed on the sides of the rack at any suitable height in the rack to support a tray, not shown.

The rack is mounted to slide into and out of the oven and, for this purpose, the bottom 30 of the oven is provided at the sides with longitudinal depressions 31 which each receive a pair of rollers 32 and 33 fixed to the bottom of the rack. These rollers are arranged one in front of the other and out of alinement with each other, as best shown in Figs. 1 and 3, the rear roller 32 being arranged at substantially the rear end of the bottom of the rack while the front roller 33 is arranged substantially midway between the front and the rear of the rack.

A pair of tracks 34 and 35 formed in each depression 31 receive the corresponding rollers 32 and 33, and these tracks are provided at the rear ends with rearwardly sloping recesses or seats 36 and 37 which permit the rack to rest upon the bottom 30 of the oven. The rollers ride up on the tracks and lift the rack above the bottom of the oven preliminary to the rack being slid out of the oven so that the rack will be raised above the bottom of the oven and may be slid out of the oven without obstruction. Conversely, when the rack is being slid into the oven, the rollers ride down into the seats and again position the rack to be supported upon the bottom of the oven, as best shown in Fig. 3.

By referring now to Fig. 4, it will be seen that the door 10 is provided on the inner face with tracks 38 which aline with the tracks 35 when the door is opened downwardly to the horizontal and receive the leading rollers 33 of the rack when the rack is thrust out of the oven to superposed position upon the door.

For sliding the rack into and out of the oven, I provide a lazy tong structure, designated in general by the numeral 39. The lazy tong structure is housed between the rack and one side of the oven, and the leading end thereof is pivoted to a standard 40 which is rigidly secured in any preferred manner to the side of the rack at the bottom, as best shown in Figs. 1 and 3. The standard is disposed substantially midway between the front and rear of the rack. As best shown in Fig. 7, a pair of pinions 41 are mounted to idle on a common stub shaft 42 secured to the side of the oven 9 and these pinions mesh with corresponding gear segments 43 integral with the rear end of the lazy tong structure. Simultaneous rotation of the pinions, one clockwise and the other counter-clockwise, turns the gear segments to expand or extend the lazy tong structure and, through the instrumentality of the standard 40, thrust the rack 23 forwardly from the oven to superposed position upon the opened door. Reverse movement of the pinions, conversely, retracts the lazy tong structure to withdraw the rack into the oven.

It is desirable that the lazy tong structure be actuated to operate the rack during the last few degrees of opening movement of the door to the horizontal and during the first few degrees of closing movement of the door. For this purpose a lever 44 is pivoted at the front end, as shown at 45, to the inner face of the oven door 10. The lever is slidably supported upon a guide roller 46 mounted upon a stub shaft 47 secured to the side of the oven and having a guide plate 48 which projects upwardly and engages the side of the lever. The rear end of the lever is provided with a cam 49 having an arcuate cam surface 50 which is disposed below the bottom edge of the lever 44. When the lever is moved forwardly by opening of the door, the cam surface 50 rides up on the guide roller 46 so that the latter lifts the rear end of the lever 44 bodily upward to connect the lever with the lazy tong structure operating mechanism, as will now be described.

The lever 44 is provided in advance of the cam surface 50 and adjacent thereto with an upwardly projecting lug 51. The lug is adapted to engage in a corresponding notch 52 formed in the lower end of a lever 53 which is pivoted intermediate the ends, as shown at 54, on the side of the oven. On opposite sides of the pivot 54 the lever is connected by links 55 and 56 to the upper ends of corresponding vertically disposed segment levers 57 and 58, as shown best in Figs. 2 and 3. These latter levers are pivoted intermediate the ends to the oven and rock pendulum-wise on a common pivot 59. The lower ends of the segment levers mesh with the pair of pinions 41.

In operation, when the oven door 10 is opened, the cam lever 44 will be slid forwardly and, during the final stages of opening movement, the lug 51 will be raised by the cam surface 50 riding up on the roller 46 to engage in the notch 52 and swing the operating lever 53 on its pivot 54. The links 55 and 56 are thereby simultaneously moved in opposite directions and impart their movement through the instrumentality of the segment levers 57 and 58 to the pinions 41 which, in turn, actuate the segments 43 to extend the lazy tong structure 39 and slide the rack out of the oven onto the open door approximately as the latter arrives at horizontal position. Conversely, since the lug 51 is still engaged in the notch 52 when the door is in horizontal position, the initial few degrees of closing movement of the door moves the cam lever 44 to rock the operating lever 53 in a reverse direction to that above described and retract the lazy tong structure 39 to withdraw the rack into the oven. When the rack is withdrawn, the lug 51 is released from the notch 52 by the cam surface 50 riding off of the roller 46 so that the cam lever 44 merely slides freely over the roller 46 during the final stages of closing movement of the door.

The pivot 45 of the cam lever 44 is preferably made removable so that the lever may be disconnected from the door and slid back into the oven when ejection of the rack from the oven is not desirable.

As an additional guide for directing the sliding movements of the rack, a roller 66, as best shown in Figs. 1 and 3, is centrally located at the rear of the top of the rack and engages a track 61 secured to the top of the oven. The track is formed with an inclined surface 62 at the rear end upon which the roller rides downwardly simultaneously with the lower rollers 32 and 33 dropping into their seats to bring the rack to rest on the bottom of the oven in retracted position.

Having thus described the invention, I claim:

1. The combination with an oven, of a rack for the oven contents movable into and out of the oven, a track on the oven bottom having depressions at the rear end, rollers carried by the rack riding on the track and seating in said depressions at the rear limit of movement of the oven, a downwardly opening door carried by the oven, a track on the inner face of said door alining with the first named track to receive certain of said rollers when the door is opened, a lazy tong structure for moving said rack into and out of the oven, and means operatively connected to said door and to said lazy tong structure for actuating the lazy tong structure during opening and closing movement of the door.

2. The combination with an oven, of a sliding rack for the oven contents normally concealed in the oven, a hinged downwardly opening door for the oven, tracks on the oven bottom, tracks on the inner face of the door, rollers on the rack sliding on both of said tracks to dispose the rack outside of the oven in superposed position upon the door when the door is opened, a lazy tong structure for moving the rack into and out of the oven, and cam-operated means connected to the door and to the lazy tong structure for extending the lazy tong structure when the door is opened and retracting the lazy tong structure when the door is closed.

3. The combination with an oven having a downwardly opening door, of a rack for the oven contents slidable out of the oven to superposed position on the door when opened, a cam lever pivoted to the door and having a cam surface at the rear end, a lazy tong structure for sliding the rack into and out of the oven, and means operated by the cam lever during the final stages of opening movement of the door to extend the lazy tong structure and operated by the cam during the initial stages of closing movement of the door to retract the lazy tong structure.

4. The combination with an oven, of a rack for the oven contents slidable into and out of the oven, a lazy tong structure for sliding the rack, oppositely rotatable pinions on the oven having segment connections with the lazy tong structure for extending and retracting the lazy tong structure, a cam lever connected to the door, a pivoted operating lever rocked by the cam lever when the door is opened or closed, and segment levers engaging said pinions and operatively connected to the operating lever on opposite sides of the pivot thereof to actuate said pinions.

5. The combination with an oven, of a rack for the oven contents slidable into and out of the oven, a lazy tong structure for moving the rack, a pivoted door for the oven, a sliding cam lever moved by opening and closing of the door and having a cam surface disposed below the lever at the rear end, a roller supporting said lever and engaging said cam surface to raise and lower the rear end of the lever, a pivoted operating lever operatively connected to said lazy tong structure for extending and retracting the lazy tong structure and having a notch, and a lug projecting upwardly from the rear end of said cam lever and entering said notch to rock said operating lever when said cam lever is elevated by said roller.

6. The combination with an oven, of a pivoted door for the oven, a rack for the oven contents slidable into and out of the oven, a lazy tong structure for actuating the rack, segments on the rear end of the lazy tong structure, oppositely rotatable pinions meshing with the segments, segment levers mounted to swing pendulum-wise and meshing with the pinions, an operating lever pivoted intermediate the ends to the oven, links connected to the segment levers and terminally connected to the operating lever on opposite sides of the pivot thereof and rocking the segment levers oppositely to rotate said pinions and actuate said lazy tong structure when the operating lever is moved, a sliding cam lever connected to said door, and means on the rear end of the cam lever for engaging said actuating lever when the door is opened or closed and adapted to impart movement of said cam lever to said operating lever.

In testimony whereof I affix my signature.

PHILIPP RITTHALER. [L. S.]